United States Patent
Liu et al.

(10) Patent No.: US 12,017,357 B2
(45) Date of Patent: Jun. 25, 2024

(54) METHOD FOR CONTROLLING VIBRATION OF FLEXIBLE MECHANICAL ARM BASED ON COOPERATIVE TRACKING

(71) Applicants: SOUTH CHINA UNIVERSITY OF TECHNOLOGY, Guangdong (CN); GUANGZHOU INSTITUTE OF MODERN INDUSTRIAL TECHNOLOGY, Guangdong (CN)

(72) Inventors: Yu Liu, Guangzhou (CN); He Cai, Guangzhou (CN); Huanli Gao, Guangzhou (CN)

(73) Assignee: SOUTH CHINA UNIVERSITY OF TECHNOLOGY, GUANGZHOU INSTITUTE OF MODERN INDUSTRIAL TECHNOLOGY (CN)

( * ) Notice: Subject to any disclaimer, the term of this patent is extended or adjusted under 35 U.S.C. 154(b) by 288 days.

(21) Appl. No.: 17/614,075

(22) PCT Filed: Mar. 12, 2021

(86) PCT No.: PCT/CN2021/080356
§ 371 (c)(1),
(2) Date: Nov. 24, 2021

(87) PCT Pub. No.: WO2021/185159
PCT Pub. Date: Sep. 23, 2021

(65) Prior Publication Data
US 2022/0234198 A1 Jul. 28, 2022

(30) Foreign Application Priority Data
Mar. 18, 2020 (CN) .......................... 202010191567.7

(51) Int. Cl.
*B25J 9/16* (2006.01)
*B25J 18/06* (2006.01)

(52) U.S. Cl.
CPC ........... *B25J 9/1615* (2013.01); *B25J 9/1605* (2013.01); *B25J 9/1664* (2013.01); *B25J 9/1682* (2013.01);
(Continued)

(58) Field of Classification Search
CPC ........ B25J 9/1615; B25J 18/06; B25J 9/1605; B25J 9/1682; B25J 9/1664; G05B 2219/40279; G05B 2219/39001
See application file for complete search history.

(56) References Cited

U.S. PATENT DOCUMENTS 10,207,404 B2 * 2/2019 Khansari Zadeh .... G06N 20/00
2019/0321972 A1 * 10/2019 Kim .......................... B25J 9/163
(Continued)

FOREIGN PATENT DOCUMENTS

| CN | 102540881 A | 7/2012 |
| CN | 104570741 A | 4/2015 |

(Continued)

OTHER PUBLICATIONS

Office Action dated Mar. 12, 2021 issued in Chinese Patent Application No. 202010191567.7 w/Brief Translation (5 pages).
(Continued)

*Primary Examiner* — Adam R Mott
*Assistant Examiner* — Mohammed Yousef Abuelhawa
(74) *Attorney, Agent, or Firm* — Polsinelli PC

(57) ABSTRACT

A method for controlling vibration of flexible mechanical arms based on cooperative tracking is disclosed, including: building a dynamic model of the flexible mechanical arm, according to a dynamic characteristic, constructing a flexible mechanical arm group made up of a plurality of flexible mechanical arms, assigning one of the plurality of flexible mechanical arms as a leader and the rest ones as followers which are required to track the leader's motion trajectory so (Continued)

as to realize cooperative work; designing cooperative control-based boundary controllers in combination with a Lyapunov method to realize cooperative work and suppress vibration of the flexible mechanical arms; and constructing a Lyapunov function using Lyapunov direct method to validate stability of the flexible mechanical arms under the control.

4 Claims, 2 Drawing Sheets

(52) U.S. Cl.
CPC ..... *B25J 18/06* (2013.01); *G05B 2219/39001* (2013.01); *G05B 2219/40279* (2013.01); *G05B 2219/42156* (2013.01)

(56) References Cited

U.S. PATENT DOCUMENTS

| | | | | |
|---|---|---|---|---|
| 2020/0189099 | A1* | 6/2020 | Sindhwani | G06N 3/008 |
| 2020/0405414 | A1* | 12/2020 | Shelton, IV | A61B 17/320092 |
| 2021/0213602 | A1* | 7/2021 | Yang | B25J 9/0084 |

FOREIGN PATENT DOCUMENTS

| | | |
|---|---|---|
| CN | 104589344 A | 5/2015 |
| CN | 104615009 A | 5/2015 |
| CN | 106078742 A | 11/2016 |
| CN | 107015567 A | 8/2017 |
| CN | 108181836 A | 6/2018 |
| CN | 108508929 A | 9/2018 |
| CN | 110609471 A | 12/2019 |
| CN | 110647104 A | 1/2020 |
| CN | 110673469 A | 1/2020 |
| CN | 111360830 A | 7/2020 |
| JP | 4-192008 A | 7/1992 |

OTHER PUBLICATIONS

International Search Report dated May 19, 2021 issued in corresponding Parent Application No. PCT/CN2021/080356 w/English Translation (8 pages).

Written Opinion dated May 19, 2021 issued in corresponding Parent Application No. PCT/CN2021/080356 (5 pages).

First Search issued in corresponding Chinese Patent Application No. 202010191567.7 (1 page).

* cited by examiner

METHOD FOR CONTROLLING VIBRATION OF FLEXIBLE MECHANICAL ARM BASED ON COOPERATIVE TRACKING

CROSS-REFERENCE OF THE RELATED APPLICATIONS

This application is a National Phase of International Application No. PCT/CN2021/080356 filed on Mar. 12, 2021, entitled "COOPERATIVE TRACKING-BASED VIBRATION CONTROL METHOD FOR FLEXIBLE MECHANICAL ARM", which claims priority to Chinese Patent Application No. 202010191567.7 filed on Mar. 18, 2020, the contents of which are expressly incorporated by reference herein in their entireties.

TECHNICAL FIELD

The present disclosure relates to the technology field of vibration control, and more particularly to a method for controlling vibration of flexible mechanical arms based on cooperative tracking.

BACKGROUND

A flexible structure has advantages of light weight and low energy consumption, and is widely applied to engineering fields such as mechanical arms, mechanical engineering, and spacecraft. A flexible mechanical arm has important applications in industrial fields, such as robots, mechanical engineering, aerospace, and the like. In flexible mechanical arm research, Euler-Bernoulli beams are generally used as basic models. Elastic deformation due to action of external disturbances results in long-lasting elastic vibration of the flexible mechanical arm, which affects normal operation of a system. The reduction or elimination of elastic deformation and vibration of the flexible mechanical arm is therefore a problem to be solved. The flexible mechanical arm is a typical distributed parameter system, i.e., in which model parameters and operating characteristics are functions of time and space coordinates, so its dynamic response is complex in elastic vibration. By studying the vibration control of the flexible mechanical arm, it is possible to obtain high precision in practical engineering.

Cooperative tracking means that a plurality of targets simultaneously tracks a motion trajectory of a specified target to achieve cooperative effect. In the practical industry, there is usually a plurality of flexible mechanical arms working at the same time, and how to make the plurality of flexible mechanical arms achieve cooperative tracking effect and to suppress vibration in terms of control is an urgent problem to be solved.

At present, most of the research on vibration control of flexible mechanical arm adopts PID control, robust control, etc., but it is rarely to report that a method for controlling vibration of flexible mechanical arm group made up of multiple flexible mechanical arms based on cooperative tracking. Therefore, the present disclosure provides a theoretical reference for cooperative tracking and vibration control of the flexible mechanical arm in fields of robotics, mechanical engineering, and the like.

SUMMARY

The present disclosure aims to provide a method for controlling vibration of a flexible mechanical arm based on cooperative tracking in order to solve the above-mentioned drawbacks in the prior art.

The object of the present disclosure can be achieved by taking the following technical solution.

A method for controlling vibration of a flexible mechanical arm based on cooperative tracking is provided, the method including:

building a dynamic model of the flexible mechanical arm, according to a dynamic characteristic of the flexible mechanical arm;

constructing a flexible mechanical arm group made up of a plurality of flexible mechanical arms based on the flexible mechanical arm, and assigning one of the plurality of flexible mechanical arms as a leader and the rest ones as followers tracking a motion trajectory of the leader;

designing cooperative tracking-based boundary controllers based on the flexible mechanical arm;

constructing a Lyapunov function for the flexible mechanical arm based on the flexible mechanical arm model and the boundary controllers; and validating stability of the flexible mechanical arm, according to the Lyapunov function.

Further, the dynamic characteristic includes kinetic energy and potential energy of the flexible mechanical arm, and virtual work done by non-conservative force acting on the flexible mechanical arm. The kinetic energy, the potential energy, and the virtual work are substituted into Hamilton's principle to obtain a dynamic model equation for the flexible mechanical arm presented as follows:

$$\rho \ddot{w}_i + EI w_i'''' - T w_i'' + \gamma \dot{w}_i = -(r+x)(\rho \ddot{\theta}_i + \gamma \dot{\theta}_i), \text{ and}$$

$$I_h \ddot{\theta} = -\gamma EI w_i'''(0, t) + EI w_i''(0, t) + T w_i(l, t) + u_{2i},$$

where $w_i(x,t)$ represents a vibration offset of an $i^{th}$ flexible mechanical arm in xoy coordinate system, $\dot{w}_i(x,t)$ and $\ddot{w}_i(x,t)$ represent the first and second derivative of time and are abbreviated as $\dot{w}_i$ and $\ddot{w}_i$ respectively, $w_i'(x,t)$, $w_i''(x,t)$, $w_i'''(x,t)$ and $w_i''''(x,t)$ represent the first, second, third and fourth derivatives of $w_i(x,t)$ with respect to x and are abbreviated as $w_i'$, $w_i''$, $w_i'''$ and $w_i''''$ respectively, $\rho$ represents a uniform mass per unit length of the flexible mechanical arm, m represents a tip mass of the flexible mechanical arm, l represents a length of the mechanical arm, r represents a radius of a rigid hub, $I_h$ represents a hub inertia, $\theta_i$ represents an attitude angle of the $i^{th}$ flexible mechanical arm, $\dot{\theta}_L$ and $\ddot{\theta}_L$ represent the first and second derivative of $\theta_i$ with respect to time respectively, T represents a tension, EI represents a bending stiffness, $\gamma$ represents a viscous damping coefficient, $w_i'''(0,t)$ represents a value of $w_i'''(x,t)$ at x=0, $w_u''''(0,t)$ represents a value of $w_i''''(x,t)$ at x=0, $w_i(l,t)$ represents a value of $w_i(x,t)$ at x=l, and $u_{2i}$ represents a controller at a fixed end position of the flexible mechanical arm.

Boundary conditions are presented as follows:

$$m\ddot{w}_i(l, t) = EI w_i'''(0, t) - m(r+l)\ddot{\theta}_i - T w_i'(l, t) + u_{1i}, \text{ and}$$

$$w_i(0, t) = w_i'(0, t) = w_i''(l, t) = 0,$$

where $\dot{w}_i(l,t)$ and $\ddot{w}_i(l,t)$ represent values of $\dot{w}_i(x,t)$ and $\ddot{w}_i(x,t)$ at x=l respectively, $w_i'(l,t)$ and $w_i''(l,t)$ represent values of $w_i'(x,t)$ and $w_i''(x,t)$ at x=l respectively, $w_i(0,t)$ and $w_i'(0,t)$ represent values of $w_i(x,t)$ and $w_i'(x,t)$ at x=0 respectively, and $u_{1i}$ represents a controller at a tip position of the flexible mechanical arm.

Further, constructing the flexible mechanical arm group composed of the plurality of flexible mechanical arms, and assigning one of the plurality of flexible mechanical arms as the leader and the rest ones as the followers, the boundary controllers are designed as follows:

defining an auxiliary variables as follows:

$$\theta_{ri} = -\nu \Sigma_{j=1}^{N} a_{ij}(\theta_i - \theta_j) - b_{i0}(\theta_i - \theta_0);$$

where $\alpha_{ij}$ is an element denoted by (i, j) in an adjacency matrix A, the adjacency matrix A represents relationships between these flexible mechanical arms as the followers, and $A=[\alpha_{ij}] \in R^{k \times k}$ is a non-negative matrix and defined that if there exists information communication between two flexible mechanical arms, then $\alpha_{ij} > 0$, otherwise, $\alpha_{ij}=0$; $b_{i0}$ is an element denoted by (i, j) in a diagonal matrix B which represents relationships between the leader and the flexible mechanical arm as the follower, and $B=diag(b_{10}, b_{20}, \ldots, b_{k0})$ is a non-negative diagonal matrix and defined that if there is information communication between the leader and the flexible mechanical arm as the follower, then $b_{i0} > 0$, otherwise, $b_{i0}=0$; and v is a positive constant, $\theta_0$ represents an attitude angle of the flexible mechanical arm as the leader, $\theta_i$ represents an attitude angle of the $i^{th}$ flexible mechanical arm, and $\theta_j$ represents an attitude angle of the $j^{th}$ flexible mechanical arm;

defining a generalized tracking error, a second tracking error, and a virtual control amount respectfully as follows:

$$e_{1i} = \theta_i - \theta_{ri}, e_{2i} = \dot{\theta}_i - u_{ei}, \text{ and } u_{ei} = \dot{\theta}_{ri} - \frac{\beta}{\alpha} e_{1i},$$

where, $\theta_{ri}$ represents an auxiliary angle, and $\dot{\theta}_{ri}$ represents the first derivative of $\theta_{ri}$ with respect to time;

defining variables as follows:

$y_{ei}(x,t) = (r+x)e_{1i} + w_i$, and $y_{ei}(x,t)$ being abbreviated as $y_{ei}$; and constructing the boundary controllers as follows:

$$u_{1i} = -\frac{\beta m}{\alpha} \dot{y}_{ei}(l, t) - k_m S_{1i}, \text{ and}$$

$$u_{2i} = -k_{p1} e_{1i} - \frac{\beta I_h}{\alpha} e_{2i} - k_{p3} u_{ei} - k_d S_{2i},$$

where $\dot{y}_{ei}(x,t)$ represents the first derivative of $y_{ei}(x,t)$ with respect to time, $\dot{y}_{ei}(l,t)$ represents a value of $\dot{y}_{ei}(x,t)$ at x=l, and $S_{1i}$ and $S_{2i}$ are designed as follows:

$$S_{1i} = a\dot{y}_i(l, t) + \beta y_{ei}(l, t), \text{ and } S_{2i} = \frac{1}{2}a\dot{\theta}_i + \beta e_{1i},$$

where $\dot{y}_i(l,t)$ represents a value of $\bar{y}_i(x,t)$ at x=l, $y_{ei}(l,t)$ represents a value of $y_{ei}(x,t)$ at x=l, and $\alpha$, $\beta$, $k_m$, $k_{p1}$, $k_{p3}$ and $k_d$ are control parameters and are non-negative constants.

Further, based on the flexible mechanical arm and the boundary controllers above, the Lyapunov function for the flexible mechanical arm is constructed as:

$V_i = V_{1i} + V_{2i} + V_{3i}$, where $$V_{1i} = \frac{\beta \gamma}{2} \int_0^l y_{ei}^2 dx + \frac{\alpha \rho}{2} \int_0^l \dot{y}_i^2 dx + \frac{\alpha T}{2} \int_0^l (w_i')^2 dx + \frac{\alpha EI}{2} \int_0^l (w_i'')^2 dx,$$

$$V_{2i} = \left(\frac{\alpha k_{p1}}{2} + \frac{\alpha \beta k_d}{4}\right) e_{1i}^2 + \frac{\alpha I_h}{4} e_{2i}^2 + \frac{m}{2\alpha} S_{1i}^2 + \frac{I_h}{\alpha} S_{2i}^2 + \frac{\alpha I_h}{4} u_{ei}^2, \text{ and}$$

$$V_{3i} = \frac{\alpha I_h}{2} e_{2i} u_{ei} + \beta \rho \int_0^l y_{ei} \dot{y}_i dx.$$

Further, according to the Lyapunov function, validating the stability of the flexible mechanical arm can be summarized as follows:

proving, by validating the Lyapunov function positive definite, the flexible mechanical arm is stable in Lyapunov theory; and proving, by validating the first derivative of the Lyapunov function negative definite, the flexible mechanical arm is asymptotically stable.

Further, the boundary controller is configured to suppress vibration of the flexible mechanical arm, and the flexible mechanical arm as the follower is capable of tracking the motion trajectory of the flexible mechanical arm as the leader to realize cooperative control.

The present disclosure has the following advantages and effects when compared with the prior art.

The present disclosure provides a method for controlling vibration of flexible mechanical arms based on cooperative tracking. Compared with the conventional control method, the method for controlling vibration based on cooperative tracking can realize cooperative tracking effect for a flexible mechanical arm group made up of a plurality of flexible mechanical arm system, and can suppress vibration of the flexible mechanical arm itself. The control method designed by the present disclosure includes two boundary controllers, one of which is for suppression vibration and another is for attitude tracking. The two boundary controllers generate control inputs for desired outputs, which can effectively improve control quality of a flexible mechanical arm system and realize cooperative tracking.

By adjusting gain parameters, stability of the flexible mechanical arm can be realized, indicating that the designed boundary controller has good control effect, and is beneficial to improve control accuracy and cooperative tracking effect in industry.

DETAILED DESCRIPTION OF THE EMBODIMENTS

In order to make the object, technical solutions, and advantages of embodiments in the present disclosure clearer, the technical solutions of the embodiments will be described more clearly and completely according to accompanying drawings in the embodiments in the present disclosure. Apparently, the described embodiments are part of the embodiments of the present disclosure, rather than all of the embodiments. Based on the embodiments of the present disclosure, all other embodiments obtained by those ordinary technicians without creative work shall be within the scope of the present disclosure.

Embodiments

Figure 1:
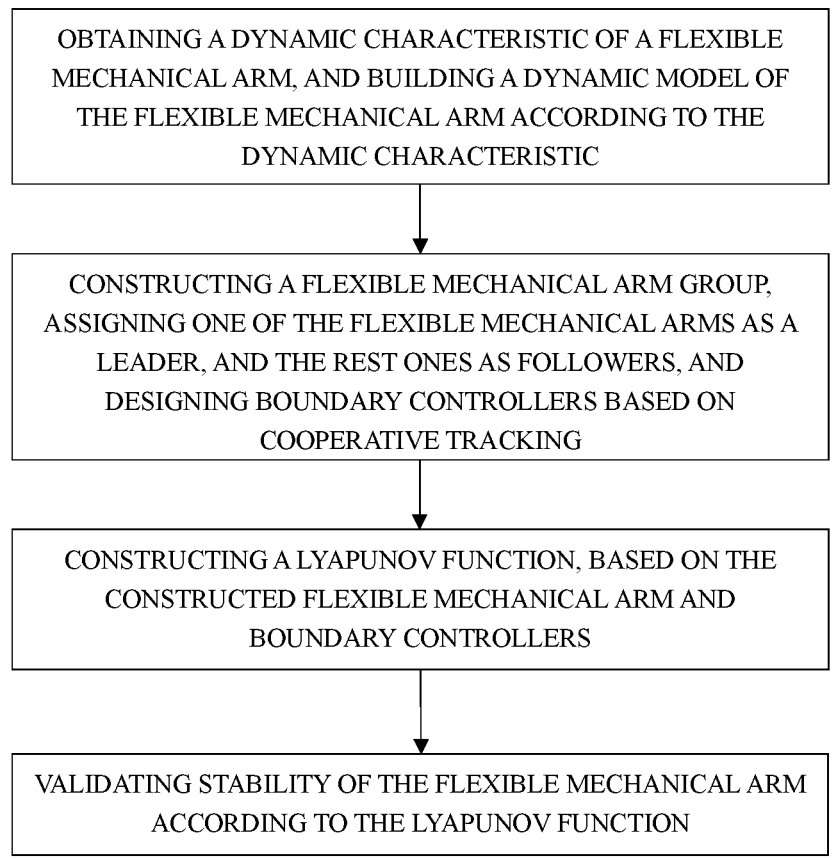
FIG. 1 is a flow schematic diagram illustrating a method for controlling vibration of a flexible mechanical arm based on collaborative tracking according to an embodiment of the present disclosure.

Referring to FIG. 1, FIG. 1 is a flow schematic diagram illustrating a method for controlling vibration of a flexible mechanical arm based on cooperative tracking according to an embodiment of the present disclosure. The method may include the following steps.

At S101, a dynamic model of the flexible mechanical arm is built according to a dynamic characteristic of the flexible mechanical arm.

Figure 2:
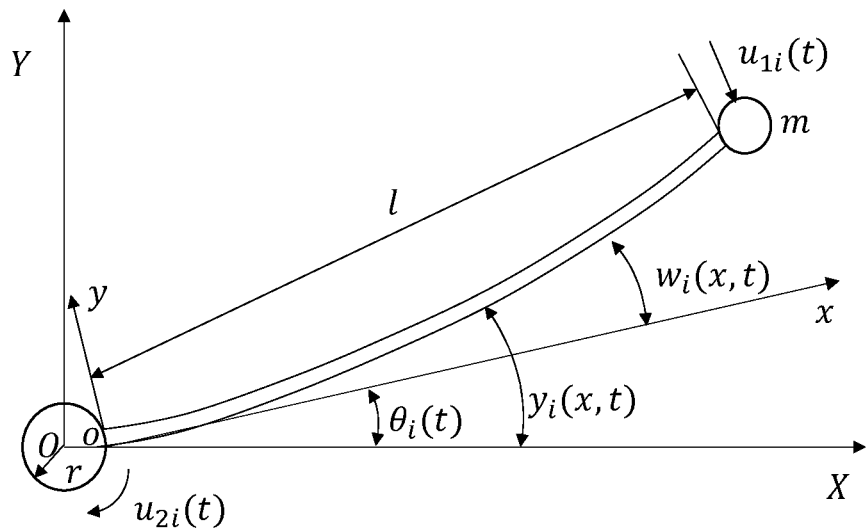
FIG. 2 is a structural schematic diagram illustrating a flexible mechanical arm according to an embodiment of the present disclosure.

As shown in FIG. 2, a typical flexible mechanical arm is with a left side boundary fixed to an origin of a coordinate system, which is called as a fixed end, and with a right side boundary loadable with a load, which is called as a tip. Boundary controllers $u_{1i}$ and $u_{2i}$ act on the tip position and the left side position of the flexible mechanical arm respectively. The flexible mechanical arm is with a length of l, a vibration offset of $w_i(x,t)$ in xoy coordinate system, and a total vibration offset of $y_i(x,t)$ in XOY coordinate system.

Kinetic energy of the flexible mechanical arm may be represented as:

$$E_{ki} = \frac{1}{2}\rho \int_0^l \dot{y}_i^2 dx + \frac{1}{2}m\dot{y}_i^2(l,t) + \frac{1}{2}I_h\dot{\theta}_i^2, \quad (1)$$

where $E_{ki}$ represents kinetic energy of an $i^{th}$ flexible mechanical arm, $\rho$ represents a uniform mass per unit length of the flexible mechanical arm, $y_i(x,t)$ represents an elastic deformation of the $i^{th}$ flexible mechanical arm at time t and location x in the XOY coordinate system and is abbreviated as $y_i$, and $\dot{y}_i(x,t)$ is the first derivative of $y_i(x,t)$ with respect to time and is abbreviated as $\dot{y}_i$, $\dot{y}_i(l,t)$ represents a value of $y_i(x,t)$ at x=l, m represents a tip mass of the flexible mechanical arm, l represents a length of the flexible mechanical arm, r represents a radius of a rigid hub, $I_h$ represents a hub inertia, $\theta_i$ represents an attitude angle, and $\dot{\theta}_i$ is the first derivative of $\theta_i$ with respect to time.

Potential energy of the flexible mechanical arm is represented as:

$$E_{pi} = \frac{1}{2}T \int_0^l (w_i')^2 dx + \frac{1}{2}EI \int_0^l (w_i'')^2 dx, \quad (2)$$

where $w_i(x,t)$ represents a vibration offset of the $i^{th}$ flexible mechanical arm in the xoy coordinate system and is abbreviated as $w_i$, $w_i'(x,t)$ and $w_i''(x,t)$ represent the first and second derivative of $w_i(x,t)$ with respect to x and are abbreviated as $w_i'$ and $w_i''$ respectively, T represents a tension, and EI represents a bending stiffness.

And virtual work done by non-conservative forces acting on the flexible mechanical arm is represented as:

$$\delta W_i = -\gamma \int_0^l \dot{y}_i \delta y_i dx + u_{1i}\delta y_i(l,t) + u_{2i}\delta\theta_i, \quad (3)$$

where δ represents a variational symbol, γ represents a viscous damping coefficient, $u_{1i}$ and $u_{2i}$ represent controllers located at the tip and the fixed end of the flexible mechanical arm respectively, and $y_i(l,t)$ represents a value of $y_i(l,t)$ at x=l.

By substituting the kinetic energy, the potential energy, and the virtual work into Hamilton's principle, a dynamic model equation for the flexible mechanical arm is obtained as follows:

$$\rho\ddot{w}_i + EIw_i'''' - Tw_i'' + \gamma\dot{w}_i = -(r+x)(\rho\ddot{\theta}_i + \gamma\dot{\theta}_i), \text{ and} \quad (4)$$

$$I_h\ddot{\theta} = -\gamma EIw_i'''(0,t) + EIw_i''(0,t) + Tw_i(l,t) + u_{2i}, \quad (5)$$

where $\dot{w}_i(x,t)$ and $\ddot{w}_i(x,t)$ represent the first and second derivative of $w_i(x,t)$ with respect to time and are abbreviated as $\dot{w}_i$ and $\ddot{w}_i$ respectively, $w_i'''(x,t)$ and $w_i''''(x,t)$ represent the third and fourth derivative of $w_i(x,t)$ with respect to x and are abbreviated as $w_i'''$ and $w_i''''$ respectively, $\ddot{\theta}_i$ represents the second derivative of the attitude angle $\theta_i$ with respect to time, $w_i'''(0,t)$ represents a value of $w_i'''(x,t)$ at x=0, $w_i''''(0,t)$ represents a value of $w_i''''(x,t)$ at x=0, $w_i(l,t)$ represents a value of $w_i(x,t)$ at x=l, and $\forall t|[0,\infty)$.

A boundary condition is presented as follows:

$$m\ddot{w}_i(l,t) = EIw_i'''(0,t) - m(r+l)\ddot{\theta}_i - Tw_i'(l,t) + u_{1i}, \text{ and} \quad (6)$$

$$w_i(0,t) = w_i'(0,t) = w_i''(l,t) = 0, \quad (7)$$

where $\dot{w}_i(l,t)$ represents a value of $\dot{w}_i(x,t)$ at x=l, $\ddot{w}_i(l,t)$ represents a value of $\ddot{w}_i(x,t)$ at x=l, w'(l,t) represents a value of $w_i'(x,t)$ at x=l, $w_i''(l,t)$ represents a value of $w_i''(x,t)$ at x=l, $u_{1i}$ represents a controller at the tip position of the flexible mechanical arm, $w_i(0,t)$ represents a value of $w_i(x,t)$ at x=0, and $w_i'(0,t)$ represents a value of $w_i'(x,t)$ at x=0.

At S102, based on the flexible mechanical arm, a flexible mechanical arm group is made up of a plurality of flexible mechanical arms, one of which is assigned as a leader, and the rest ones are followers. Then the boundary controllers are constructed based on cooperative tracking.

Figure 3:
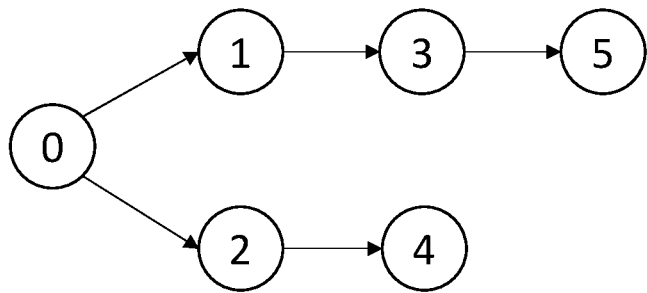
FIG. 3 is an example diagram illustrating a network topology of a flexible mechanical arm group according to an embodiment of the present disclosure.

As shown in FIG. 3, the flexible mechanical arm numbered 0 is assigned as a leader, and the others are followers. The follower needs to track the leader's motion trajectory to realize the cooperative control of multiple flexible arms. Arrows represent information communication between the flexible mechanical arms, and the adjacency matrix A represents information communication relationship between these followers, and the diagonal matrix B represents information communication relationship between the leader and the followers.

In order to reduce or eliminate vibration of the flexible mechanical arm and to achieve cooperative tracking of the plurality of flexible mechanical arms, a kind of cooperative tracking-based boundary controller is constructed. Details are as follows An auxiliary variable is defined as:

$$\theta_{ri} = -v\sum_{j=1}^{N} a_{ij}(\theta_i - \theta_j) - b_{i0}(\theta_i - \theta_0), \quad (8)$$

where $A=[\alpha_{ij}]\in R^{k\times k}$ is a non-negative matrix and is defined that if there is information communication between two flexible mechanical arms, then $\alpha_{ij}>0$, otherwise $\alpha_{ij}=0$; $B=\mathrm{diag}(b_{10}, b_{20}, \ldots, b_{k0})$ is a non-negative diagonal matrix and is defined that if there is information communication between the leader and the follower, then $b_{i0}>0$, otherwise, $b_{i0}=0$; and v is a positive constant, $\theta_0$ represents an attitude angle of the flexible mechanical arm as the leader, and $\theta_i$ and $\theta_j$ represent attitude angles of the $i^{th}$ and $j^{th}$ flexible mechanical arms respectively.

A generalized tracking error, a second tracking error, and a virtual control amount are respectively defined as:

$$e_{1i} = \theta_i - \theta_{ri}, \quad (9)$$

$$e_{2i} = \dot{\theta}_i - u_{ei}, \text{ and} \quad (10)$$

$$u_{ei} = \dot{\theta}_{ri} - \frac{\beta}{\alpha} e_{1i}, \quad (11)$$

where $\dot{\theta}_{ri}$ is the first derivative of $\theta_{ri}$ with respect to time.
A variables is defined as follows:

$$y_{ei}(x,t) = (r+x)e_{1i} + w_i, \quad (12)$$

$y_{ei}(x,t)$ is abbreviated as $y_{ei}$.
Boundary controllers are constructed as follows:

$$u_{1i} = -\frac{\beta m}{\alpha} \dot{y}_{ei}(l,t) - k_m S_{1i}, \text{ and} \quad (13)$$

$$u_{2i} = -k_{p1} e_{1i} - \frac{\beta I_h}{\alpha} e_{2i} - k_{p3} u_{ei} - k_d S_{2i}, \quad (14)$$

where $\dot{y}_{ei}(x,t)$ represents the first derivative of $y_{ei}(x,t)$ with respect to time, and $\dot{y}_{ei}(l,t)$ represents a value of $\dot{y}_{ei}(x,t)$ at $x=l$.
$S_{1i}$, and $S_{2i}$ are proposed as follows:

$$S_{1i} = a\dot{y}_i(l,t) + \beta y_{ei}(l,t) \text{ and } S_{2i} = \frac{1}{2} a\dot{\theta}_i + \beta e_{1i}, \quad (15)$$

where $\dot{y}_i(l,t)$ represents a value of $\dot{y}_i(x,t)$ at $x=l$, $y_{ei}(l,t)$ represents a value of $y_{ei}(x,t)$ at $x=l$, and $\alpha$, $\beta$, $k_m$, $k_{p1}$, $k_{p3}$ and $k_d$ are gain parameters of the boundary controller and all are greater than 0.

Most of the existing researches on vibration control of the flexible mechanical arm focus on a single flexible mechanical arm system, and many of them adopt PID control, robust control, and so on. In this embodiment, the auxiliary variable represents information communication relationship among the flexible mechanical arms, and then two boundary controllers located at the fixed end and the tip respectively are constructed, so that not only vibration suppression effect can be achieved, but also the effect of cooperative tracking of these multiple flexible mechanical arms are achieved. All of the above signals can be obtained by sensors or calculations.

At S103, A Lyapunov function for the flexible mechanical arm is constructed based on the flexible mechanical arm and the boundary controllers.

The Lyapunov function is constructed as:

$$V_i = V_{1i} + V_{2i} + V_{3i}. \quad (16)$$

$$V_{1i} = \frac{\beta\gamma}{2}\int_0^l y_{ei}^2 dx + \frac{\alpha\rho}{2}\int_0^l \dot{y}_i^2 dx + \frac{\alpha T}{2}\int_0^l (w_i')^2 dx + \frac{\alpha EI}{2}\int_0^l (w_i'')^2 dx, \quad (17)$$

$$V_{2i} = \left(\frac{\alpha k_{p1}}{2} + \frac{\alpha\beta k_d}{4}\right)e_{1i}^2 + \frac{\alpha I_h}{4}e_{2i}^2 + \frac{m}{2\alpha}S_{1i}^2 + \frac{I_h}{\alpha}S_{2i}^2 + \frac{\alpha I_h}{4}u_{ei}^2, \text{ and} \quad (18)$$

$$V_{3i} = \frac{\alpha I_h}{2}e_{2i}u_{ei} + \beta\rho\int_0^l y_{ei}\dot{y}_i dx. \quad (19)$$

where $V_{1i}$, $V_{2i}$ and $V_{3i}$ are as follows respectively:

$$V_{1i} = \frac{\beta\gamma}{2}\int_0^l y_{ei}^2 dx + \frac{\alpha\rho}{2}\int_0^l \dot{y}_i^2 dx + \frac{\alpha T}{2}\int_0^l (w_i')^2 dx + \frac{\alpha EI}{2}\int_0^l (w_i'')^2 dx, \quad (17)$$

$$V_{2i} = \left(\frac{\alpha k_{p1}}{2} + \frac{\alpha\beta k_d}{4}\right)e_{1i}^2 + \frac{\alpha I_h}{4}e_{2i}^2 + \frac{m}{2\alpha}S_{1i}^2 + \frac{I_h}{\alpha}S_{2i}^2 + \frac{\alpha I_h}{4}u_{ei}^2, \text{ and} \quad (18)$$

$$V_{3i} = \frac{\alpha I_h}{2}e_{2i}u_{ei} + \beta\rho\int_0^l y_{ei}\dot{y}_i dx. \quad (19)$$

At S104, stability of the flexible mechanical arm is validated according to the Lyapunov function. In this step, A Lyapunov direct method is used to validate the stability of the flexible mechanical arm.

In this embodiment, if the flexible mechanical arm meets a preset requirement, that is, the stability of the flexible arms in Lyapunov theory can be drawn from the fact that the Lyapunov function is validated positive definite.

By validating the Lyapunov function with the first derivative negative definite, it is obtained that the flexible mechanical arm is asymptotically stable.

In this embodiment, the positive definiteness of the Lyapunov function is validated as follows.

According to an inequality $ab \leq \frac{1}{2}(a^2+b^2)$, it may be obtained that:

$$|V_{3i}| \leq \frac{\alpha I_h}{4}e_{2i}^2 + \frac{\alpha I_h}{4}u_{ei}^2 + \beta\rho\sigma_1\int_0^l y_{ei}^2 dx + \frac{\beta\rho}{\sigma_1}\int_0^l \dot{y}_i^2 dx. \quad (20)$$

According to the equation (16), it may be determined that the Lyapunov function is positive definite, i.e.

$$V_i \geq \left(\frac{\beta\gamma}{2} - \beta\rho\sigma_1\right)\int_0^l y_{ei}^2 dx + \left(\frac{\alpha\rho}{2} - \frac{\beta\rho}{\sigma_1}\right)\int_0^l \dot{y}_i^2 dx + \frac{\alpha T}{2}\int_0^l (w_i')^2 dx + \quad (21)$$

$$\frac{\alpha EI}{2}\int_0^l (w_i'')^2 dx + \left(\frac{\alpha k_{p1}}{2} + \frac{\alpha\beta k_d}{4}\right)e_{1i}^2 + \frac{m}{2\alpha}S_{1i}^2 + \frac{I_h}{\alpha}S_{2i}^2 > 0,$$

where $\frac{2\beta}{\alpha} < \sigma_1 < \frac{\gamma}{2\rho}$.

The positive definiteness of the Lyapunov function is validated.

The negative definiteness of the first derivative of the Lyapunov function is validated as follows.

The derivative of $V_i(t)$ with respect to time is taken as:

$$\dot{V}_i = \dot{V}_{1i} + \dot{V}_{2i} + \dot{V}_{3i}. \quad (22)$$

Calculating the derivative of $V_{1i}$, $V_{2i}$ and $V_{3i}$ in (16) with respect to time and then adding them together, it can be obtained that:

$$\dot{V}_i \leq -\left(\beta T - \frac{\beta\gamma l^2}{\sigma}\right)\int_0^l (w_i')^2 dx - (\beta EI - 16\eta l^4)\int_0^l (w_i'')^2 dx - \quad (23)$$

$$\left[2\beta k_{p1} + \frac{2\beta^3 I_h}{\alpha^2} + \frac{\beta^2 k_d}{2} + \eta(2rl+8l) - \frac{\beta(\gamma\sigma+\rho)(r+l)^3}{6} - \frac{\beta\gamma l^3}{\sigma}\right]e_{1i}^2 -$$

$$\eta\int_0^l y_{ei}^2 dx - \left(\alpha\gamma - \frac{3\beta\rho}{2}\right)\int_0^l \dot{y}_i^2 dx - \left(\frac{\alpha^2 k_d}{4} - \frac{\alpha k_{p3}}{2}\right)e_{2i}^2 -$$

$$k_m S_{1i}^2 - k_d S_{2i}^2 - \left[\frac{\alpha k_{p3}}{2} + \frac{\alpha^2 k_d}{4} - \frac{\beta(\gamma\sigma+\rho)(r+l)^3}{6}\right]u_{ei}^2,$$

where η and σ are positive constants.
Appropriate parameters should be selected as follows:

$$\begin{cases} \alpha, \beta, k_m > 0, \sigma > 1 \\ k_d > \frac{\beta(\gamma\sigma+\rho)(r+l)^3}{3\sigma^2}, k_{p3} < \frac{\alpha k_d}{2} \\ k_{p1} > \frac{\beta(\gamma\sigma+\rho)(r+l)^3}{12} + \frac{\gamma l^3}{2\sigma} - \frac{\beta^2 I_h}{\alpha^2} - \frac{\beta k_d}{4} - \eta(2rl+8l) \end{cases} \quad (24)$$

It is obtained that $\dot{V}_i \geq 0$, i.e., $\dot{V}_i$ is semi-negative definiteness.
From (21), it can be obtained that:

$$\lambda_1(V_{1i}+V_{2i}+V_{3i}) \leq V_i \leq \lambda_2(V_{1i}+V_{2i}+V_{3i}), \text{ where} \quad (25)$$

$$\lambda_1 = \min\left\{\frac{\gamma-2\rho\sigma_1}{\gamma}, \frac{\alpha\sigma_1-2\beta}{\alpha\sigma_1}, 1\right\},$$

$$\lambda_2 = \max\left\{\frac{\gamma+2\rho\sigma_1}{\gamma}, \frac{\alpha\sigma_1+2\beta}{\alpha\sigma_1}, 1\right\}.$$

When λ meets the following conditions:

$$\lambda = \frac{1}{\lambda_2}\min\left\{\frac{2\eta}{\beta\gamma}, \frac{2\alpha\gamma-3\beta\rho}{\alpha\rho}, \frac{2(\beta\sigma T-\beta rl^2)}{\alpha\sigma T}, \frac{2(\beta EI-16\eta l^4)}{\alpha EI},\right.$$

$$\frac{2\beta k_{p1}+\frac{2\beta^3 I_h}{\alpha^2}+\frac{\beta k_d}{2}+\eta(2rl+8l)-\frac{\beta(\gamma\sigma+\rho)(r+l)^3}{6}-\frac{\beta\gamma l^3}{\sigma}}{2\alpha k_{p1}+\alpha\beta k_d}, \frac{\alpha k_d - 2k_{p3}}{I_h},$$

$$\left.\frac{2\alpha k_m}{m}, \frac{\alpha k_d}{I_h}, \frac{6\alpha k_{p3}+3\alpha^2 k_d - 2\beta(\gamma\sigma+\rho)(r+l)^3}{3\alpha I_h}\right\} > 0.$$

Multiplying both sides of (25) by $e_{\lambda t}$, it can be obtained that:

$$|w_i| = \sqrt{\frac{2l}{\alpha T\lambda_1}V_i(0)e^{-\lambda t}} \text{ and} \quad (27)$$

$$|e_{1i}| \leq \sqrt{\frac{4}{(2\alpha k_{p1}+\alpha\beta k_d)}V_i(0)e^{-\lambda t}}.$$

Thus, it holds that $$\forall (x,t) \in [0,l] \times [0,t_n], \lim_{t\to 0}|w_i|=0 \text{ and } \lim_{t\to 0}|e_{1i}|=0.$$

According to the above analysis, the stability of the flexible mechanical arm based on cooperative tracking is validated.

It should be noted that, referring to FIGS. 2 and 3, FIG. 2 is a schematic diagram illustrating a flexible mechanical arm according to an embodiment of the present disclosure. FIG. 3 is an example diagram illustrating a network topology of a flexible mechanical arm group, mainly showing information communication relationship among the flexible mechanical arms. As shown in FIG. 3, a flexible mechanical arm group made up of six flexible robotic arms is consider, in which the flexible mechanical arm numbered 0 is the leader, the rest numbered flexible mechanical arms are the followers. the followers numbered 1 and 2 have information communication with the leader numbered 0, and the followers numbered 3, 4 and 5 have information communication with the followers numbered 1, 2 and 3 respectively. Information communication relationship among the flexible mechanical arms is represented by an adjacency matrix A and a diagonal matrix B. The adjacency matrix A represents information communication relationship between the flexible mechanical arms as followers. The diagonal matrix B represents information communication relationship between the leader and the flexible mechanical arms as followers. $A=[\alpha_{ij}]\in R^{k\times k}$ is a non-negative matrix and is defined that if there is information communication between two flexible mechanical arms, then $\alpha_{ij}>0$, otherwise $\alpha_{ij}=0$. $B=\text{diag}(b_{10}, b_{20}, \ldots, b_{k0})$ is a non-negative diagonal matrix and is defined that if there is information communication between the leader and the flexible mechanical arm as the follower, then $b_{i0}>0$, otherwise, $b_{i0}=0$.

Appropriate gain parameters are selected to validate the positive definiteness of the Lyapunov function and the negative definiteness of the first derivative of the Lyapunov function.

In this embodiment, the numerical simulations of the flexible arms can be conducted on MATLAB and then the corresponding simulation results can be obtained. According to the simulation results, it can be judged whether the control effect of the flexible mechanical arm under control can meet expectations. If it is, the operation can be ended. If not, the gain parameters of the boundary controller should be corrected and the numerical simulation should be performed again.

In summary, the present embodiment provides a method for controlling vibration of a flexible mechanical arm based on cooperative tracking, including: building a dynamic model of the flexible mechanical arm; constructing a flexible mechanical arm group made up of a plurality of flexible mechanical arms, assigning one of the plurality of flexible mechanical arms as a leader and the rest ones as followers; determining information communication relationship, and designing cooperative tracking-based boundary controllers located at a fixed end and a tip position of the flexible mechanical arm respectively; and validating stability of the flexible mechanical arm under control. The disclosure can realize the control of the flexible mechanical arms more stably and accurately, and can also realize the cooperative tracking of the flexible mechanical arm.

The above-mentioned embodiments are preferred embodiments of the present disclosure, but embodiments of the present disclosure are not limited to the above-mentioned embodiments. Any other changes, modifications, substitutions, combinations, and simplifications which do not depart from the spirit and principles of the present disclosure are intended to be equivalent permutations and are included within the scope of the present disclosure.

What is claimed is:

1. A method for controlling vibration of a plurality of flexible mechanical arms based on cooperative tracking, the method comprising:
   kinematic each of establishing a dynamic model equation for each of the plurality of flexible mechanical arms, according to characteristics of the flexible mechanical arms including kinetic energy, potential energy, and virtual work done by non-conservative force acting on the flexible mechanical arm;
   assigning one of the plurality of flexible mechanical arms as a leader and the rest ones as followers which need to track the leader's motion trajectory;
   designing cooperative tracking-based boundary controllers based on the plurality of flexible mechanical arms;
   constructing a Lyapunov function for each of the plurality of flexible mechanical arms based on the dynamic model equation and the boundary controllers; and
   validating stability of each of the plurality of flexible mechanical arms, according to the Lyapunov function,
   wherein the dynamic model equation is obtained by substituting the kinetic energy, the potential energy, and the virtual work into Hamilton's principle, and the kinematic model equation is as follows:

$$\rho \ddot{w}_i + EI w_i'''' - T w_i'' + \gamma \dot{w}_i = -(r+x)(\rho \ddot{\theta}_i + \gamma \dot{\theta}_i),$$

$$\text{and } I_h \ddot{\theta} = -\gamma EI w_i''''(0, t) + EI w_i''(0, t) + T w_i(l, t) + u_{2i},$$

where $w_i(x,t)$ represents a vibration offset of an ith flexible mechanical arm in xoy coordinate system, $\dot{w}_i(x,t)$ and $\ddot{w}_i(x,t)$ represent the first and second derivative of time and are abbreviated as $\dot{w}_i$ and $\ddot{w}_i$ respectively, $w'_i(x,t)$, $w''_i(x,t)$, $w'''_i(x,t)$ and $w''''_i(x,t)$ represent the first, second, third and fourth derivatives of $w_i(x,t)$ with respect to x and are abbreviated as $w''_i$, $w''_i$, $w'''_i$ and $w''''_i$ respectively, $\rho$ represents a uniform mass per unit length of the flexible mechanical arm, m represents a tip mass of the flexible mechanical arm, l represents a length of the mechanical arm, r represents a radius of a rigid hub, lh represents a hub inertia, $\theta_i$ represents an attitude angle of the ith flexible mechanical arm, $\dot{\theta}_i$ and $\ddot{\theta}_i$ represent the first and second derivative of $\theta_i$ with respect to time respectively, T represents a tension, EI represents a bending stiffness, $\gamma$ represents a viscous damping coefficient, $w'''_i(0,t)$ represents a value of $w'''_i(x,t)$ at x=0, $w''''_i(x,t)$ represents a value of $w''''_i(x,t)$ at x=0, $w_i(l,t)$ represents a value of $w_i(x,t)$ at x=l, and $u_{2i}$ represents a controller at a fixed end position of the flexible mechanical arm,
   wherein a boundary condition is as follows:

$$m\ddot{w}_i(l, t) = EI w_i'''(0, t) - m(r + l)\ddot{\theta}_i - T w_i'(l, t) + u_{1i}, \text{ and}$$

$$w_i(0, t) = w_i'(0, t) = w_i''(l, t) = 0,$$

where $w_i(l,t)$ and $w_i(l,t)$ represent values of $w_i(x,t)$ and $w_i(x,t)$ at x=l respectively, $w'_i(l,t)$ and $w''_i(l,t)$ represent values of $w''_i(x,t)$ and $w''_i(x,t)$ at x=l respectively, $w_i(0,t)$ and $w''_i(0,t)$ represent values of $w_i(x,t)$ and $w''_i(x,t)$ at x=0 respectively, and $u_{1i}$ represents a controller at a tip position of the flexible mechanical arm, and
   wherein the boundary controllers are configured to suppress vibration of the plurality of flexible mechanical arms, and to perform cooperative control in such a way that the flexible mechanical arm as one of the followers tracks the motion trajectory of the flexible mechanical arm as the leader.

2. The method of claim 1, wherein assigning one of the plurality of flexible mechanical arms as the leader and the rest ones as the followers, and designing the boundary controller includes:
   defining an auxiliary variable as follows:

$$\theta_{ri} = -v \sum_{j=1}^{N} a_{ij}(\theta_i - \theta_j) - b_{io}(\theta_i - \theta_o),$$

where $\alpha_{ij}$ is an element denoted by (i, j) in an adjacency matrix A, the adjacency matrix A represents relationships between respective flexible mechanical arms as the follower, and $A=[\alpha_{ij}] \in R^{k \times k}$ is a non-negative matrix and defined that if there is information communication between the followers, then $\alpha_{ij}>0$, otherwise, $\alpha_{ij}=0$; $b_{i0}$ is an element denoted by (i, j) in a diagonal matrix B which represents relationships between the leader and the flexible mechanical arms as the follower, and $B=\text{diag}(b_{10}, b_{20}, \ldots, b_{k0})$ is a non-negative diagonal matrix and defined that if there exists information communication between the leader and the followers, then $b_{i0}>0$, otherwise, $b_{i0}=0$; and v is a positive constant, $\theta_0$ represents an attitude angle of the flexible mechanical arm as the leader, $\theta_i$ represents an attitude angle of the $i^{th}$ flexible mechanical arm, and $\theta_j$ represent an attitude angle of a $j^{th}$ flexible mechanical arm;
   defining a generalized tracking error, a second tracking error, and a virtual control amount respectfully as follows:

$$e_{1i} = \theta_i - \theta_{ri}, e_{2i} = \dot{\theta}_i - u_{ei} \text{ and } u_{ei} = \dot{\theta}_{ri} - \frac{\beta}{\alpha}e_{1i},$$

where $\theta_{ri}$ represents an auxiliary angle, and $\dot{\theta}_{ri}$ represents the first derivative of $\theta_{ri}$ with respect to time;
   defining variables as follows:
   $y_{ei}(x,t)=(r+x)e_{1i}+w_i$, and
   $y_{ei}(x,t)$ being abbreviated as $y_{ei}$; and
   designing the boundary controllers as follows:

$$u_{1i} = -\frac{\beta m}{\alpha}\dot{y}_{ei}(l, t) - k_m S_{1i}, \text{ and}$$

$$u_{2i} = -k_{p1}e_{1i} - \frac{\beta I_h}{\alpha}e_{2i} - k_{p3}u_{ei} - k_d S_{2i},$$

where $\dot{y}_{ei}(x,t)$ represents the first derivative of $y_{ei}(x,t)$ with respect to time, $\dot{y}_{ei}(l,t)$ represents a value of $\dot{y}_{ei}(x,t)$ at x=l, and $S_{1i}$ and $S_{2i}$ are as follows respectfully:

$$S_{1i} = a\dot{y}_i(l, t) + \beta y_{ei}(l, t) \text{ and } S_{2i} = \frac{1}{2}a\dot{\theta}_i + \beta e_{1i},$$

where $\dot{y}_i(l,t)$ represents a value of $\dot{y}_i(x,t)$ at $x=l$, $y_{ei}(l,t)$ represents a value of $y_{ei}(x,t)$ at $x=l$, and $\alpha$, $\beta$, $k_m$, $k_{p1}$, $k_{p3}$ and $k_d$ represent control parameters and are non-negative constants.

3. The method of claim 2, wherein the Lyapunov function for each of the flexible mechanical arms is constructed as follows:

$V_i = V_{1i} + V_{2i} + V_{3i}$,
where $V_i = V_{1i} + V_{2i} + V_{3i}$, where $$V_{1i} = \frac{\beta\gamma}{2}\int_0^l y_{ei}^2 dx + \frac{\alpha\rho}{2}\int_0^l \dot{y}_i^2 dx + \frac{\alpha T}{2}\int_0^l (w_i')^2 dx + \frac{\alpha EI}{2}(w_i'')^2 dx,$$

$$V_{2i} = \left(\frac{\alpha k_{p1}}{2} + \frac{\alpha\beta k_d}{4}\right)e_{1i}^2 + \frac{\alpha I_h}{4}e_{2i}^2 + \frac{m}{2\alpha}S_{1i}^2 + \frac{I_h}{\alpha}S_{2i}^2 + \frac{\alpha I_h}{4}u_{ei}^2, \text{ and}$$

$$V_{3i} = \frac{\alpha I_h}{2}e_{2i}u_{ei} + \beta\rho\int_0^l y_{ei}\dot{y}_i dx.$$

4. The method of claim 1, wherein validating stability of the flexible mechanical arm, according to the Lyapunov function, includes:
proving, by validating a positive definiteness of the Lyapunov function, the flexible mechanical arm is stable in a Lyapunov theory; and
proving, by validating a negative definiteness of the first derivative of the Lyapunov function, the flexible mechanical arm is asymptotically stable.

* * * * *